(12) United States Patent
Guan (10) Patent No.: US 12,180,984 B2
(45) Date of Patent: Dec. 31, 2024

(54) ELECTRO-HYDRAULIC ARTIFICIAL MUSCLE WITH THREE-DIMENSIONAL INTERACTIVE STACKED ELECTRODES

(71) Applicant: Chundong Guan, Jilin (CN)

(72) Inventor: Chundong Guan, Jilin (CN)

( * ) Notice: Subject to any disclaimer, the term of this patent is extended or adjusted under 35 U.S.C. 154(b) by 0 days.

(21) Appl. No.: 18/277,957

(22) PCT Filed: Apr. 6, 2022

(86) PCT No.: PCT/CN2022/085298
§ 371 (c)(1),
(2) Date: Aug. 18, 2023

(87) PCT Pub. No.: WO2022/213976
PCT Pub. Date: Oct. 13, 2022

(65) Prior Publication Data
US 2024/0141928 A1 May 2, 2024

(30) Foreign Application Priority Data
Apr. 8, 2021 (CN) .......................... 202110379210.6

(51) Int. Cl.
*F15B 15/08* (2006.01)
*B25J 9/10* (2006.01)
*F15B 19/00* (2006.01)

(52) U.S. Cl.
CPC ........... *F15B 15/088* (2013.01); *B25J 9/1075* (2013.01); *F15B 19/00* (2013.01)

(58) Field of Classification Search
CPC ........ F15B 21/06; F15B 21/065; B25J 9/1075
See application file for complete search history.

(56) References Cited

U.S. PATENT DOCUMENTS 7,511,402 B2 *  3/2009  Ito ........................... F03G 7/005
                                                         310/800
11,611,293 B2 *  3/2023  Rowe ..................... B25J 9/1075
(Continued)

FOREIGN PATENT DOCUMENTS

WO    WO-2020180986 A1 *  9/2020

OTHER PUBLICATIONS

Philipp Rothemund et al., "HASEL Artificial Muscles for a New Generation of Lifelike Robots-Recent Progress and Future Opportunities", Advanced Materials, 2020, 2003375.
(Continued)

*Primary Examiner* — Thomas E Lazo (57) ABSTRACT

An electro-hydraulic artificial muscle with three-dimensional interactive stacked electrodes includes at least two flexible conductive electrodes wrapped by a flexible insulation material. The flexible conductive electrodes are interactively stacked, immersed in a fluid dielectric and then are wrapped by a flexible sealing layer. Two ends of the flexible conductive electrodes that are three-dimensionally interactively stacked are led out from the flexible sealing layer to be connected with an external power supply. The two ends of the flexible conductive electrodes that are three-dimensionally interactively stacked are connected with the flexible sealing layer. Under the action of an applied electric field, the flexible conductive electrodes wrapped by the flexible insulation material break down the fluid dielectric and approach each other. Simultaneously, the fluid dielectric between the flexible conductive electrodes wrapped by the flexible insulation material is extruded.

10 Claims, 8 Drawing Sheets

(56) References Cited

U.S. PATENT DOCUMENTS

2020/0032822 A1* 1/2020 Keplinger ............... F15B 15/18
2021/0003149 A1* 1/2021 Keplinger ............... F15B 15/10
2021/0283769 A1* 9/2021 Rowe ..................... H02N 1/002

OTHER PUBLICATIONS

Kellaris et al., "Peano-HASEL actuators: Muscle-mimetic, electrohydraulic transducers that linearly contract on activation", Science Robotics 3, eaar3276 (2018), Jan. 5, 2018.

* cited by examiner

ELECTRO-HYDRAULIC ARTIFICIAL MUSCLE WITH THREE-DIMENSIONAL INTERACTIVE STACKED ELECTRODES

BACKGROUND OF THE PRESENT INVENTION

Field of Invention

The present invention relates to an artificial muscle, and more particularly to an electro-hydraulic artificial muscle with three-dimensional interactive stacked electrodes.

Description of Related Arts

The existing artificial muscles include typically ion polymerized metal complexes and pneumatic artificial muscles. In recent years, an electro-hydraulic technology has appeared in this field, such as HASEL (hydraulically amplified self-healing electrostatic) artificial muscle.

However, due to simple structure, the output displacement of electro-hydraulic artificial muscle is much less than that of pneumatic artificial muscle, which limits the popularization and application of related technologies. Therefore, how to design an electro-hydraulic artificial muscle with practical value, especially in obtaining greater output displacement and greater energy conversion efficiency, is the focus of attention of relevant technicians in the field.

SUMMARY OF THE PRESENT INVENTION

An object of the present invention is to improve the existing electro-hydraulic artificial muscle technology, and concretely to increase the output displacement and energy conversion efficiency of the existing electro-hydraulic artificial muscle. Moreover, based on the prior art, through combining the electric field force with the fluid pressure the electro-hydraulic artificial muscle provided by the present invention is able to be widely applied to bio-robots and wearable devices such as flexible exoskeleton.

In one embodiment, an electro-hydraulic artificial muscle with three-dimensional interactive stacked electrodes is disclosed, the electro-hydraulic artificial muscle comprises:
a flexible insulation material;
at least two flexible conductive electrodes wrapped by the flexible insulation material;
a flexible sealing layer, wherein:
the at least two flexible conductive electrodes wrapped by the flexible insulation material are interactively stacked and immersed in a fluid dielectric wrapped by the flexible sealing layer;
two ends of the at least two flexible conductive electrodes wrapped by the flexible insulation material after three-dimensional interactive stack are connected with two ends of an interior of the flexible sealing layer respectively;
the at least two flexible conductive electrodes are led out from the flexible sealing layer and are connected with an external power supply;
when the external power supply is powered, under an action of an applied electric field, the at least two flexible conductive electrodes wrapped by the flexible insulation material break down the fluid dielectric and approach each other, and simultaneously, the fluid dielectric between the at least two flexible conductive electrodes wrapped by the flexible insulation material is extruded, so that under a combined action of an electric field force and a fluid pressure caused by the electric field force, the flexible sealing layer is able to expand and contract in a special direction.

In one embodiment, the at least two flexible conductive electrodes wrapped by the flexible insulation material are interactively stacked in a spiral manner.

In one embodiment, the at least two flexible conductive electrodes wrapped by the flexible insulation material are interactively stacked in a folding manner.

In one embodiment, the liquid dielectric is a Newtonian fluid.

In one embodiment, the liquid dielectric is a non-Newtonian fluid.

In one embodiment, multiple electro-hydraulic artificial muscles with three-dimensional interactive stacked electrodes are made into muscle fibers that are able to be assembled into bundles.

In one embodiment, a flexible conductive layer is attached to an outer surface of the flexible sealing layer.

In one embodiment, the electro-hydraulic artificial muscle with three-dimensional interactive stacked electrodes expands and contracts by controlling a voltage between the at least two flexible conductive electrodes wrapped by the flexible insulation material.

In one embodiment, an expansion and contraction degree of the electro-hydraulic artificial muscle with three-dimensional interactive stacked electrodes is determined by measuring electrical parameters between the at least two flexible conductive electrodes wrapped by the flexible insulation material.

In one embodiment, an expansion and contraction degree of the electro-hydraulic artificial muscle with three-dimensional interactive stacked electrodes is determined by measuring electrical parameters between multiple flexible conductive layers attached to the outer surface of the flexible sealing layer.

It should be understood that the previous general description and the subsequent detailed description are illustrative and explanatory, and are not limitation on the protective scope of the present invention.

DETAILED DESCRIPTION OF THE PREFERRED EMBODIMENT

The present invention is explained detailedly in combination with drawings and embodiments as follows. Other features, purposes, and advantages of the present invention become apparent from the specification, drawings and claims.

Figure 1:
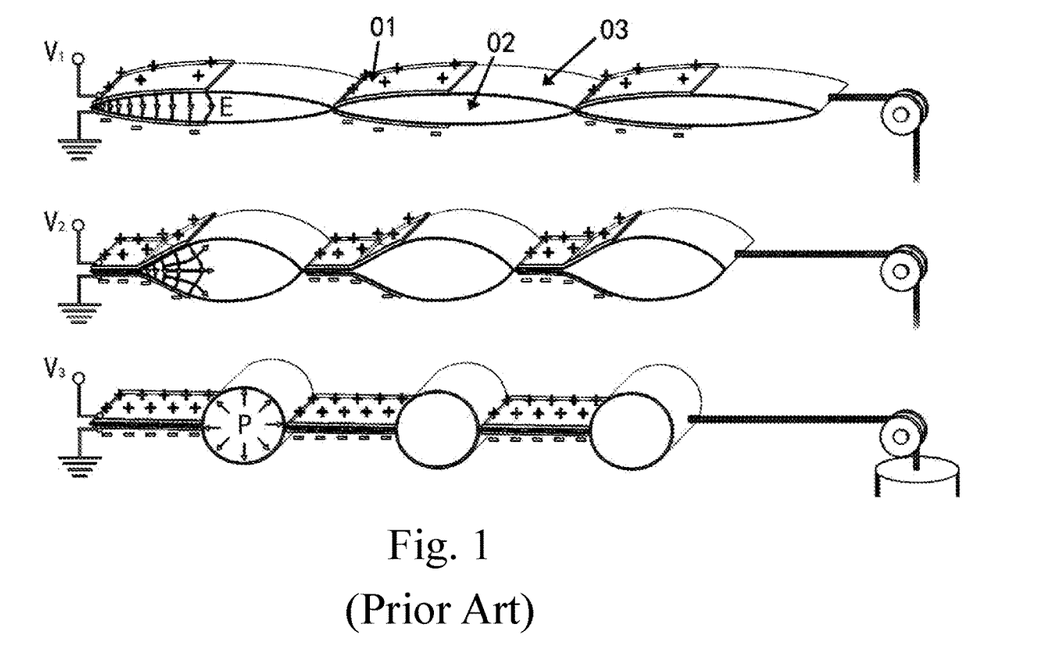
FIG. 1 is a schematic diagram of an existing electro-hydraulic artificial muscle.

FIG. 1 is a schematic diagram of an existing electro-hydraulic artificial muscle, in which a liquid dielectric 02 is sealed in a flexible sealing layer 03, and two flexible conductive electrodes 01 are partially attached to an outer surface of the flexible sealing layer 03. After connecting the two flexible conductive electrodes 01 with an external power supply, the liquid dielectric 02 in the flexible sealing layer 03 is broken down by an electric field E formed by the two flexible conductive electrodes 01, here, V1<V2≤V3 V1, V2 and V3 are voltages applied on the two flexible conductive electrodes 01. And then, the two flexible conductive electrodes 01 approach each other under an action of an electric field force till the liquid dielectric 02, which is broken down between the two flexible conductive electrodes 01, is completely extruded to flow to a side of the flexible sealing layer 03. In this process, according to Pascal's law, the liquid dielectric 02 is concentrated to one end of the flexible sealing layer 03 due to a liquid pressure P, so that the flexible sealing layer 03 contracts as a whole, thereby achieving the contraction function required by the artificial muscle. It should be noted that, in this existing electro-hydraulic artificial muscle, a volume of the liquid dielectric 02 in the flexible sealing layer 03 is less than a maximum volume of the flexible sealing layer 03, the flexible sealing layer 03 is made from a flexible material with low extensibility, otherwise the required contraction function is unable to be realized. At the same time, due to the barrier of the flexible sealing layer 03, the two flexible conductive electrodes 01 are unable to conduct to form a loop.

Figure 2:
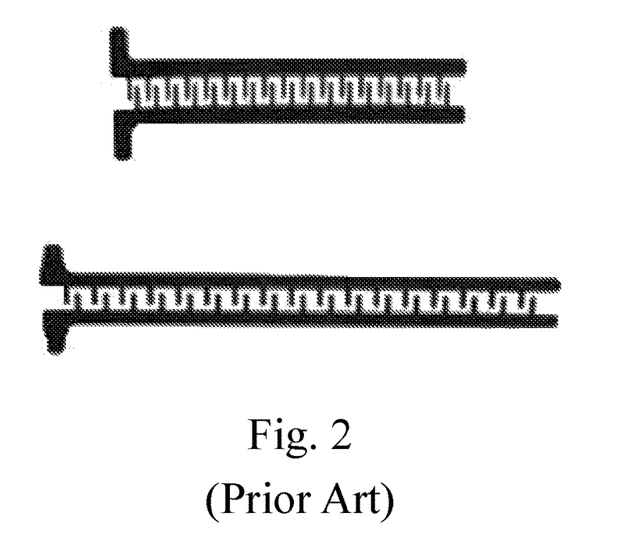
FIG. 2 is a schematic diagram of an existing electro-hydraulic artificial muscle with two-dimensional layout of electrodes.

FIG. 2 is a structurally schematic diagram of two flexible conductive electrodes with elasticity arranged in a two-dimensional tooth manner of an electro-hydraulic artificial muscle. Through this arrangement manner, the liquid dielectric between the two electrodes is also able to be extruded to flow, but it is difficult to effectively use the electric field force to drive the artificial muscle to contract due to the area limitation of the two electrodes. Therefore, a more efficient electrode arrangement is obviously beneficial, which is also the main technical problem solved by the present invention.

Figure 3:
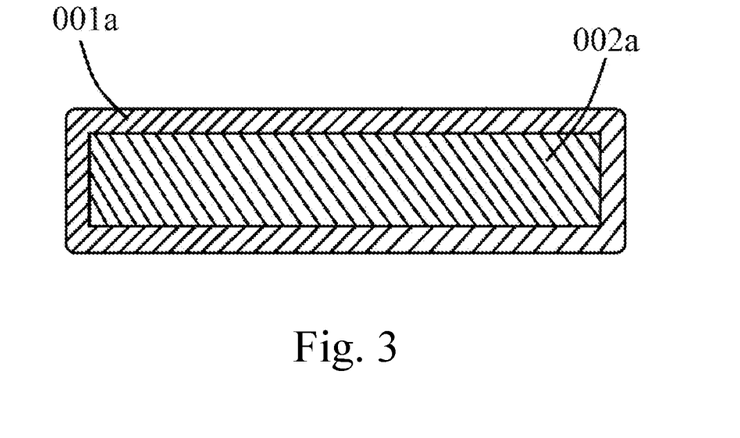
FIG. 3 is a cross sectional view of a flexible conductive electrode wrapped by a flexible insulation material provided by the present invention.

FIG. 3 is a cross sectional view of a flexible conductive electrode 002a wrapped by a flexible insulation material 001a. This wrapping structure is suitable for spiral interactive stack and folding interactive stack of electrodes.

Figure 4:
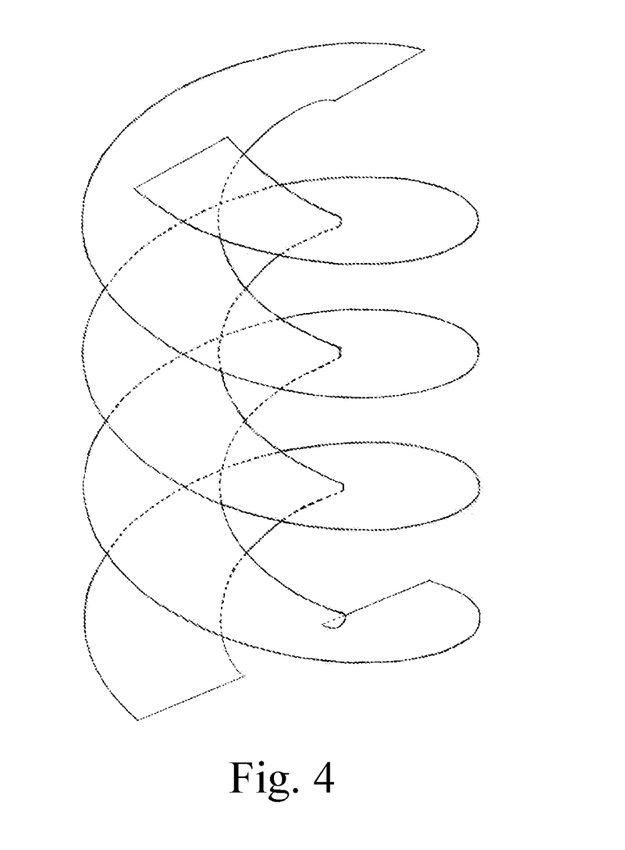
FIG. 4 shows two flexible conductive electrodes wrapped by the flexible insulation material are interactively stacked in a spiral manner provided by the present invention.
Figure 13:
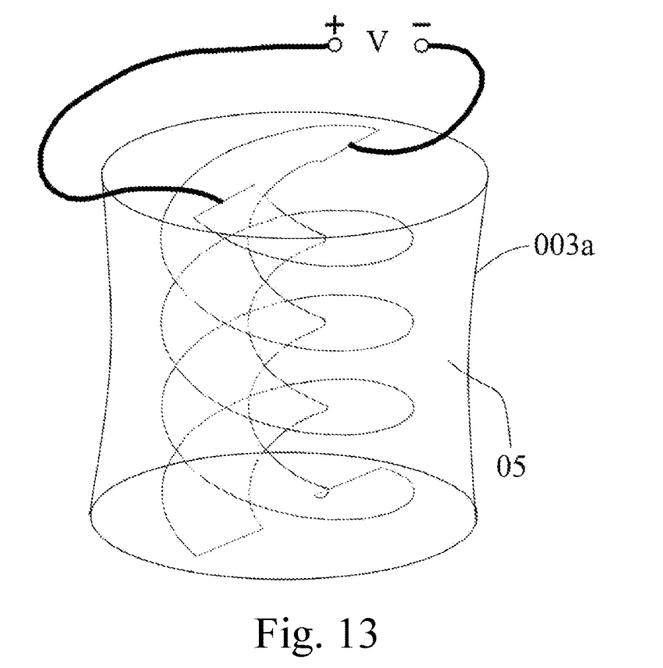
FIG. 13 shows the electro-hydraulic artificial muscle with three-dimensional interactive stacked electrodes provided by the present invention.
Figure 14:
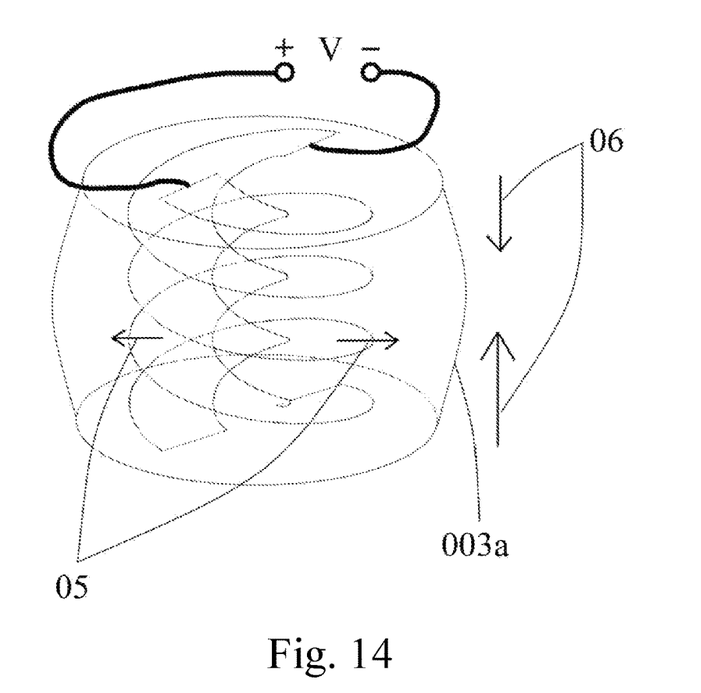
FIG. 14 shows that the electro-hydraulic artificial muscle expands and contracts in a specific direction after the power supply is powered.

FIG. 4 shows the spiral interactive stack of the flexible conductive electrodes 002a wrapped by the flexible insulation material 001a according to a preferred embodiment of the present invention. When two flexible conductive electrodes 002a wrapped by the flexible insulation material 001a are spirally interactively stacked, most of a surface area of any one of the two flexible conductive electrodes 002a wrapped by the flexible insulation material 001a is corresponding to most of a surface area of another of the two flexible conductive electrodes 002a wrapped by the flexible insulation material 001a. Referring to FIGS. 13 and 14, two ends of the two flexible conductive electrodes 002a, which are wrapped by the flexible insulation material 001a and interactively stacked, are connected with two ends of an interior of a flexible sealing layer 003a respectively, and are immersed in a fluid dielectric 05 wrapped by the flexible sealing layer 003a; the two flexible conductive electrodes 002a are led out from the flexible sealing layer 003a and connected with an external power supply. When there is a potential difference V between the two flexible conductive electrodes 002a due to the external power supply, the spiral interactive stack structure is able to drive the flexible sealing layer 003a to contract as a whole. Here, the potential difference V is determined according to a relative distance and a surface area between the two flexible conductive electrodes 002a wrapped by the flexible insulation material 001a, a dielectric constant of the fluid dielectric 05 and an expected contraction capacity, which satisfies the basic conditions that the two flexible conductive electrodes 002a wrapped by the flexible conductive material 001a are able to break down the fluid dielectric 05 under the action of electric field force and are able to attract each other. At the same time, under the action of electric field force, the fluid dielectric 05, which is provided between the two flexible conductive electrodes 002a wrapped by the flexible insulation material 001a and is broken down by the electric field force, move towards a periphery of the two flexible conductive electrodes 002a wrapped by the flexible insulation material 001a along directions of arrows shown in FIG. 14, so that under the action of the electric field force and the fluid pressure generated by the electric field force, the electro-hydraulic artificial muscle according to the preferred embodiment of the present invention contracts along directions of arrows 06 shown in FIG. 14. The contraction degree of the electro-hydraulic artificial muscle provided by the present invention is able to be accurately controlled by adjusting the potential difference V. For example, an impulse voltage is used to determine the contraction degree of the electro-hydraulic artificial muscle provided by the present invention. A time gap between two impulse voltages is for measuring electrical parameters between the two flexible conductive electrodes 002a wrapped by the flexible insulation material 001a, such as voltage and capacitance, so as to judge the contraction degree of the electro-hydraulic artificial muscle provided by the present invention according to the measured electrical parameters.

It should be noted that according to the preferred embodiment, the fluid dielectric 05 is able to be either gaseous or liquid. When the fluid dielectric 05 is a gaseous Newtonian fluid, the fluid pressure generated by the electric field force contributes less to the contraction of the electro-hydraulic artificial muscle provided by the present invention. However, the gaseous dielectric is meaningful in some applications, such as robotic arms of aerospace equipment, which are sensitive to weight.

When the fluid dielectric 05 is liquid, a sum, of the volume of the two flexible conductive electrodes 002a wrapped by the flexible insulation material 001a and then interactively stacked and the volume of the fluid dielectric 05, is less than the maximum volume of the flexible sealing layer 003a, so that the flexible sealing layer 003a is able to contract and expand. It should be emphasized that the flexible sealing layer 003a is also made from a flexible material with low extensibility.

When the fluid dielectric 05 is a liquid Newtonian fluid, it has the same function as the liquid dielectric of the existing electro-hydraulic artificial muscle.

When the fluid dielectric 05 is a non-Newtonian fluid, such as the non-Newtonian fluid which is formed by fluid dielectric doped with high dielectric constant particles, this non-Newtonian fluid dielectric not only has the function of liquid dielectric in the existing electro-hydraulic artificial muscle technology, but also for some special applications, such as the flexible exoskeleton used in the military, due to the physical properties of the non-Newtonian fluid, this non-Newtonian fluid dielectric has a certain degree of bulletproof effect.

In combination with the above embodiment, those skilled in the art should also consider that when the flexible conductive electrodes 002a wrapped by the flexible insulation material 001a are arranged in a spiral interactive stack manner, it is also feasible to use more even number of electrodes to alternately connect with two electrodes of the external power supply, which is not described here.

Figure 5:
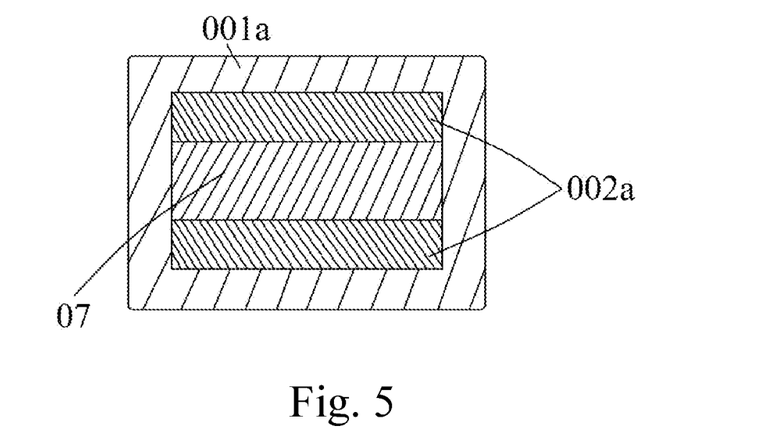
FIG. 5 is a cross sectional view showing that two flexible conductive electrodes wrapped by the flexible insulation material are attached to two surfaces of a flexible insulation substrate respectively provided by the present invention.
Figure 6:
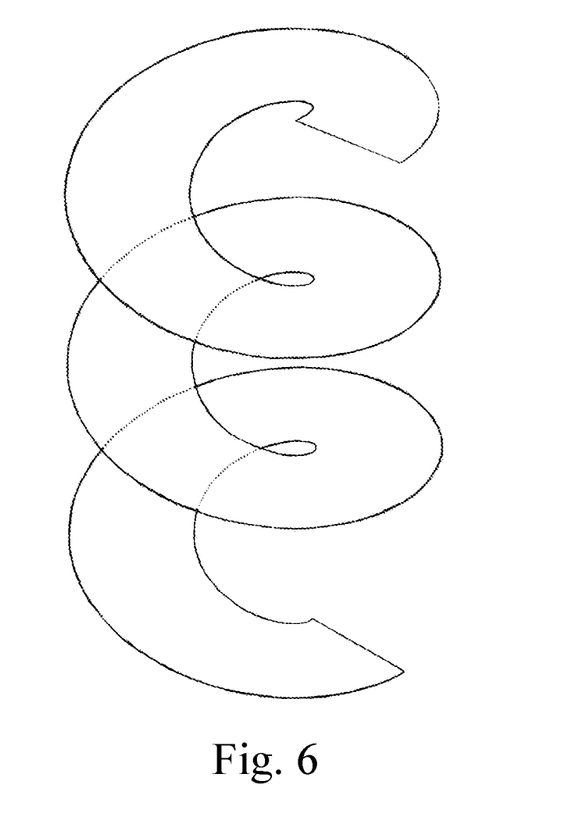
FIG. 6 shows that the flexible insulation substrate and two flexible conductive electrodes attached to two surfaces of the flexible insulation substrate respectively, all of which are wrapped by the flexible insulation material, are interactively stacked in a single spiral manner..

Based on some examples of the above spiral interactive stack of electrodes, FIGS. 5 and 6 show a simplified spiral interactive stack of electrodes. FIG. 5 is a cross sectional view of the simplified spiral interactive stack of electrodes, in which the two flexible conductive electrodes 002a are attached to two surfaces of a flexible insulation substrate 07 respectively, the two flexible conductive electrodes 002a and the flexible insulation substrate 07 are wrapped by the flexible insulation material 001a. Based on the cross sectional view shown in FIG. 5, FIG. 6 shows a single spiral interactive stack of electrodes, in which the two flexible conductive electrodes 002a, which are attached to the two surfaces of the flexible insulation substrate 07 respectively and wrapped by the flexible insulation material 001a together with the flexible insulation substrate 07, are arranged in the single spiral interactive stack manner. In this structure, similarly, most of a surface area of any one of the two flexible conductive electrodes 002a wrapped by the flexible insulation material 001a is corresponding to most of a surface area of another of the two flexible conductive electrodes 002a wrapped by the flexible insulation material 001a, which means that this spiral interactive stack of electrodes is also able to achieve the purpose of the present invention.

FIGS. 7 to 11 show the folding interactive stack of the two flexible conductive electrodes 002a which are wrapped by the flexible insulation material 001a, in which the two flexible conductive electrodes 002a which are wrapped by the flexible insulation material 001a are represented by electrode 1E and electrode 2E respectively.

Figure 7:
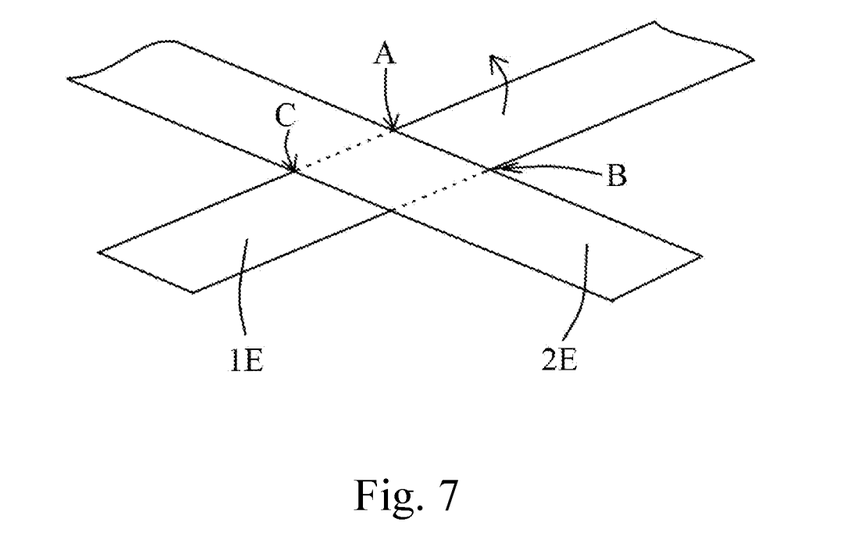
FIG. 7 is a first schematic diagram showing that two flexible conductive electrodes wrapped by the flexible insulation material are interactively stacked in a folding manner provided by the present invention.
Figure 8:
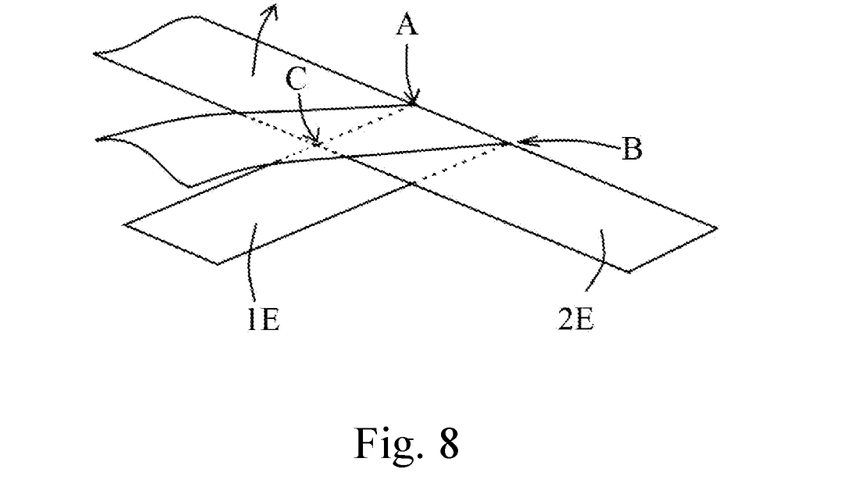
FIG. 8 is a second schematic diagram showing that two flexible conductive electrodes wrapped by the flexible insulation material are interactively stacked in the folding manner provided by the present invention.
Figure 9:
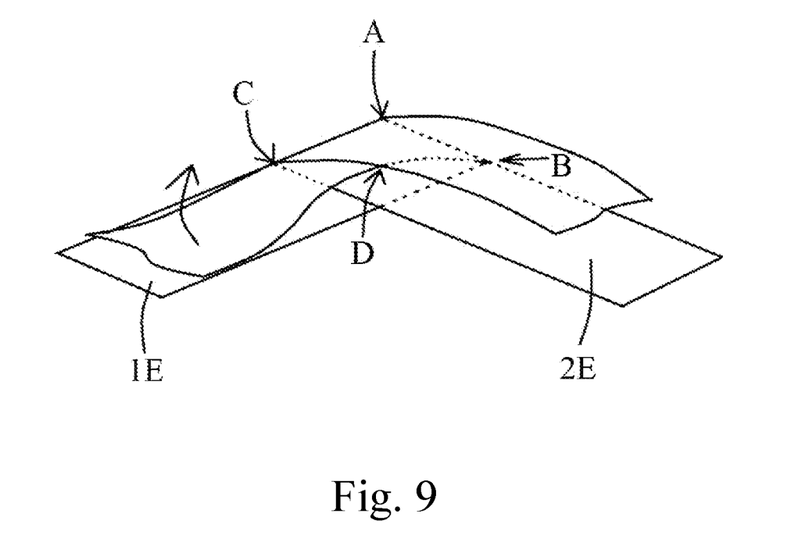
FIG. 9 is a third schematic diagram showing that two flexible conductive electrodes wrapped by the flexible insulation material are interactively stacked in the folding manner provided by the present invention.
Figure 10:
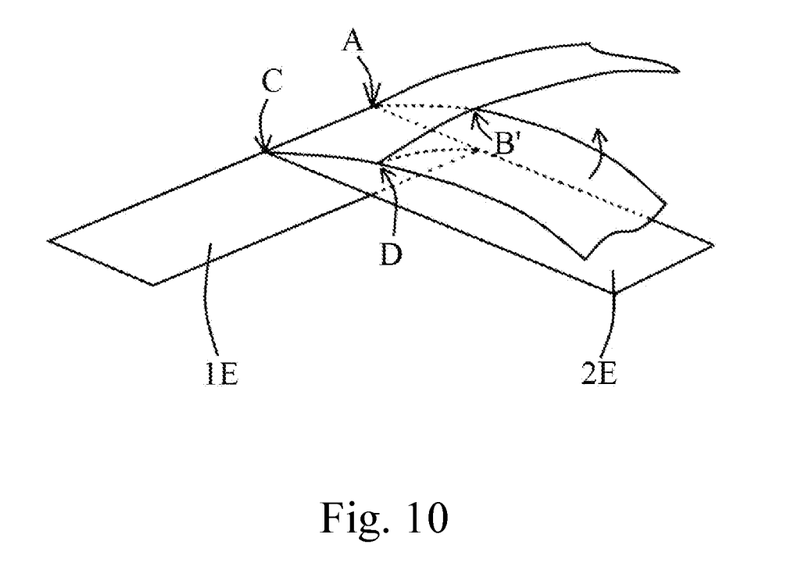
FIG. 10 is a fourth schematic diagram showing that two flexible conductive electrodes wrapped by the flexible insulation material are interactively stacked in the folding manner provided by the present invention.
Figure 11:
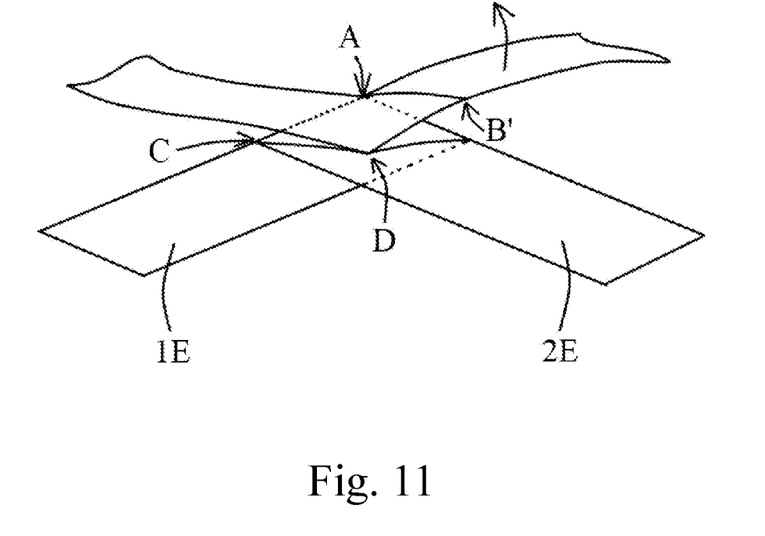
FIG. 11 is a fifth schematic diagram showing that two flexible conductive electrodes wrapped by the flexible insulation material are interactively stacked in the folding manner provided by the present invention.

Referring to FIG. 7, the electrode 2E intersects the electrode 1E at a 90-degree angle and is fixed on a surface of the electrode 1E; the electrode 1E turns 180-degree angle along a line segment AB in a direction shown by an arrow in FIG. 7; and then, referring to FIG. 8, the electrode 2E turns 180-degree angle along a line segment AC in a direction shown by an arrow in FIG. 8; and then, referring to FIG. 9, the electrode 1E turns 180-degree angle along a line segment CD in a direction shown by an arrow in FIG. 9; and then, referring to FIG. 10, the electrode 2E turns 180-degree angle along a line segment DB' in a direction shown by an arrow in FIG. 10; and then, referring to FIG. 11, the electrode 1E turns 180-degree angle along a line segment AB' in a direction shown by an arrow in FIG. 11.

Figure 12:
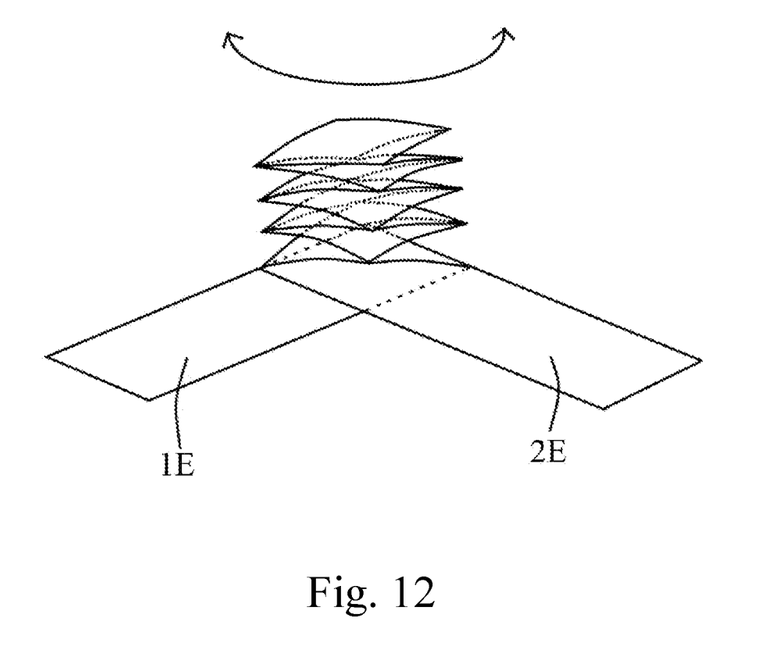
FIG. 12 is a three-dimensional structural diagram of two flexible conductive electrodes wrapped by the flexible insulation material after interactive stack in the folding manner provided by the present invention.

A three-dimensional interactive stack of electrodes shown in FIG. 12 is able to be obtained by repeating the above steps. It should be noted that the number of folding is only related to the specification of the target design, and the number of folding given in the drawings is only an example. When the number of folding reaches the design purpose, one end of the electrode 1E and one end of the electrode 2E should be fixed together on the premise of mutual insulation, so as to avoid the loose failure of the folding interactive stack structure. Finally, two ends of the three-dimensional interactive stack of electrodes should be connected with two ends of the interior of the flexible sealing layer 003a respectively. At the same time, in the process of expansion and contraction of this folding interactive stack structure, a rotation vector roughly perpendicular to an expansion and contraction direction of the folding interactive stack structure is generated, as shown by an arrow in FIG. 12. For the present invention, this folding interactive stack structure has obvious advantages in some applications that require artificial muscles to expand, contract and twist at the same time.

Figure 15:
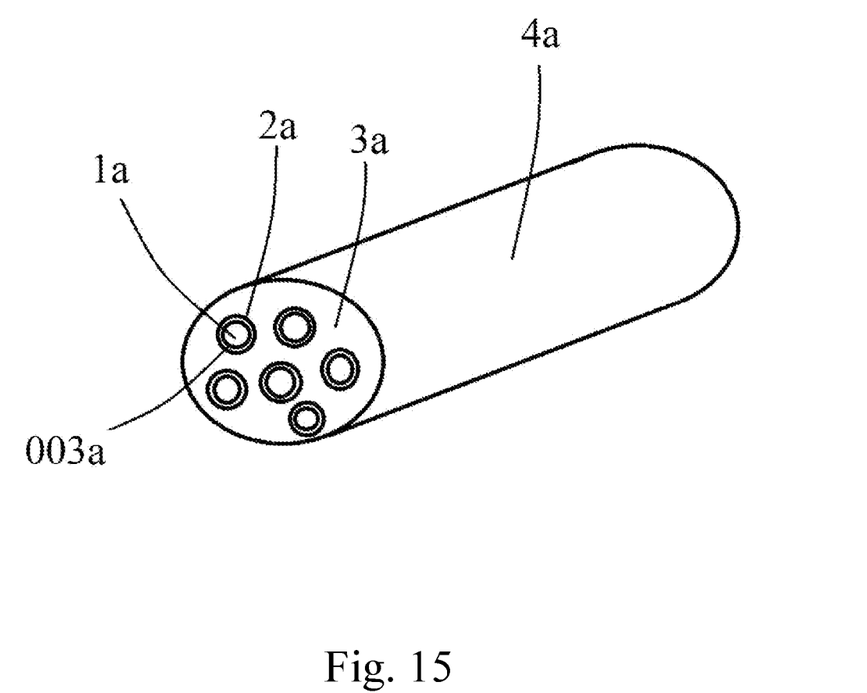
FIG. 15 shows that multiple electro-hydraulic artificial muscles with three-dimensional interactive stacked electrodes are made into muscle fibers which are able to be gathered into bundles.

FIG. 15 shows another embodiment of the present invention. According to this embodiment, multiple electro-hydraulic artificial muscles with three-dimensional interactive stacked electrodes are bound to an artificial muscle bundle 4a. At the same time, a flexible conductive layer 2a is attached to a surface of the flexible sealing layer 003a of the electro-hydraulic artificial muscle 1a. Through measuring the electro-hydraulic parameter variation of the flexible conductive layer 2a which is attached to the surface of the flexible sealing layer 003a in the expansion and contraction process, the expansion and contraction degree of the electro-hydraulic artificial muscle 1a provided by the present invention is able to be determined. To improve the strength of the artificial muscle bundle 4a, it is necessary to fill a medium 3a among multiple electro-hydraulic artificial muscles 1a. The medium 3a is made from a flexible, fluid or plastic material.

What is claimed is:
1. An electro-hydraulic artificial muscle with three-dimensional interactive stacked electrodes, the electro-hydraulic artificial muscle comprising:
   a flexible insulation material;
   at least two flexible conductive electrodes wrapped by the flexible insulation material;

a flexible sealing layer, wherein:
- the at least two flexible conductive electrodes wrapped by the flexible insulation material are interactively stacked and immersed in a fluid dielectric;
- the at least two flexible conductive electrodes wrapped by the flexible insulation material and the fluid dielectric are wrapped by the flexible sealing layer;
- two ends of the at least two flexible conductive electrodes wrapped by the flexible insulation material after being interactively stacked are connected with two ends of an interior of the flexible sealing layer respectively;
- the at least two flexible conductive electrodes are led out from the flexible sealing layer and are connected with two electrodes of an external power supply respectively;
- when the external power supply is powered, under an action of an applied electric field, the at least two flexible conductive electrodes wrapped by the flexible insulation material break down the fluid dielectric and approach each other, and simultaneously, the fluid dielectric between the at least two flexible conductive electrodes wrapped by the flexible insulation material is extruded, so that under a combined action of an electric field force and a fluid pressure caused by the electric field force, the flexible sealing layer is able to expand and contract in a special direction.

2. The electro-hydraulic artificial muscle with three-dimensional interactive stacked electrodes according to claim 1, wherein the at least two flexible conductive electrodes are interactively stacked in a spiral manner.

3. The electro-hydraulic artificial muscle with three-dimensional interactive stacked electrodes according to claim 1, wherein the at least two flexible conductive electrodes are interactively stacked in a folding manner.

4. The electro-hydraulic artificial muscle with three-dimensional interactive stacked electrodes according to claim 1, wherein the liquid dielectric is a Newtonian fluid.

5. The electro-hydraulic artificial muscle with three-dimensional interactive stacked electrodes according to claim 1, wherein the liquid dielectric is a non-Newtonian fluid.

6. The electro-hydraulic artificial muscle with three-dimensional interactive stacked electrodes according to claim 1, wherein multiple electro-hydraulic artificial muscles with three-dimensional interactive stacked electrodes are made into muscle fibers that are able to be assembled into bundles.

7. The electro-hydraulic artificial muscle with three-dimensional interactive stacked electrodes according to claim 1, wherein a flexible conductive layer is attached to an outer surface of the flexible sealing layer.

8. The electro-hydraulic artificial muscle with three-dimensional interactive stacked electrodes according to claim 7, wherein an expansion and contraction degree of the electro-hydraulic artificial muscle with three-dimensional interactive stacked electrodes is determined by measuring electrical parameters between the at least two flexible conductive electrodes wrapped by the flexible insulation material.

9. The electro-hydraulic artificial muscle with three-dimensional interactive stacked electrodes according to claim 1, wherein the electro-hydraulic artificial muscle with three-dimensional interactive stacked electrodes expands and contracts by controlling a voltage between the at least two flexible conductive electrodes.

10. The electro-hydraulic artificial muscle with three-dimensional interactive stacked electrodes according to claim 1, wherein an expansion and contraction degree of the electro-hydraulic artificial muscle with three-dimensional interactive stacked electrodes is determined by measuring electrical parameters between the at least two flexible conductive electrodes wrapped by the flexible insulation material.

* * * * *